(12) United States Patent
Yamada

(10) Patent No.: US 8,400,646 B2
(45) Date of Patent: Mar. 19, 2013

(54) IMAGE PROCESSING APPARATUS AND COMPUTER READABLE MEDIUM

(75) Inventor: Kazuo Yamada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 892 days.

(21) Appl. No.: 12/511,725

(22) Filed: Jul. 29, 2009

(65) Prior Publication Data

US 2010/0245878 A1 Sep. 30, 2010

(30) Foreign Application Priority Data

Mar. 26, 2009 (JP) ................. 2009-076025

(51) Int. Cl.
*G06F 15/00* (2006.01)
*G06F 9/46* (2006.01)
(52) U.S. Cl. ................. 358/1.13; 718/102
(58) Field of Classification Search ............ 358/1.13
See application file for complete search history.

(56) References Cited

U.S. PATENT DOCUMENTS

2009/0044130 A1* 2/2009 Saluja .................. 715/750

FOREIGN PATENT DOCUMENTS

| JP | A-08-194812 | 7/1996 |
| JP | A-8-223382 | 8/1996 |
| JP | A-10-173836 | 6/1998 |
| JP | A-10-240467 | 9/1998 |
| JP | A-2006-192810 | 7/2006 |

OTHER PUBLICATIONS

Office Action dated Mar. 8, 2011 in Japanese Patent Application No. JP-2009-076025 (w/translation).

* cited by examiner

*Primary Examiner* — Saeid Ebrahimi Dehkordy
(74) *Attorney, Agent, or Firm* — Oliff & Berridge, PLC

(57) ABSTRACT

An image processing apparatus is provided, the image processing apparatus including: a dynamic circuit reconfiguring section in which a circuit is dynamically reconfigured; a circuit configuration storing section that stores information of configurations of circuits, the information including a first piece of information that contains a configuration of a circuit singly performing one image processing, and a second piece of information that contains a configuration of a circuit including a compression circuit that compresses image information and performing a plurality of image processings in parallel; and a circuit configuration controlling section that switchingly reads out the first piece of information and the second piece of information from the circuit configuration storing section and that controls the circuit reconfiguration in the dynamic circuit reconfiguring section.

8 Claims, 16 Drawing Sheets

IMAGE PROCESSING APPARATUS AND COMPUTER READABLE MEDIUM

CROSS-REFERENCE TO RELATED APPLICATIONS

This application is based on and claims priority under 35 U.S.C. 119 from Japanese Patent Application No. 2009-076025 filed Mar. 26, 2009.

BACKGROUND

1. Technical Field

The present invention relates to an image processing apparatus and a computer readable medium.

2. Related Art

Recently, many image processing apparatuses having multi-functions such as a copy function, an image input function, a print function, and a facsimile function have been developed.

SUMMARY

According to an aspect of the present invention, there is provided an image processing apparatus including:

a dynamic circuit reconfiguring section in which a circuit is dynamically reconfigured;

a circuit configuration storing section that stores information of configurations of circuits, the information including a first piece of information that contains a configuration of a circuit singly performing one image processing, and a second piece of information that contains a configuration of a circuit including a compression circuit that compresses image information and performing a plurality of image processings in parallel; and a circuit configuration controlling section that switchingly reads out the first piece of information and the second piece of information from the circuit configuration storing section and that controls the circuit reconfiguration in the dynamic circuit reconfiguring section.

BRIEF DESCRIPTION OF THE DRAWINGS

Exemplary embodiment of the present invention will be described in detail based on the following figures, wherein.

DETAILED DESCRIPTION

Hereinafter, a mode (hereinafter, referred to as an exemplary embodiment) for carrying out the invention will be described. The description will be made in the following sequence:

1. Apparatus configuration;
2. Comparative example;
3. Basic operation of exemplary embodiment;
4. Basic configuration of exemplary embodiment;
5. Specific operation; and
6. Image processing control program.

<1. Apparatus Configuration>

[First Apparatus Configuration]

Figure 1:
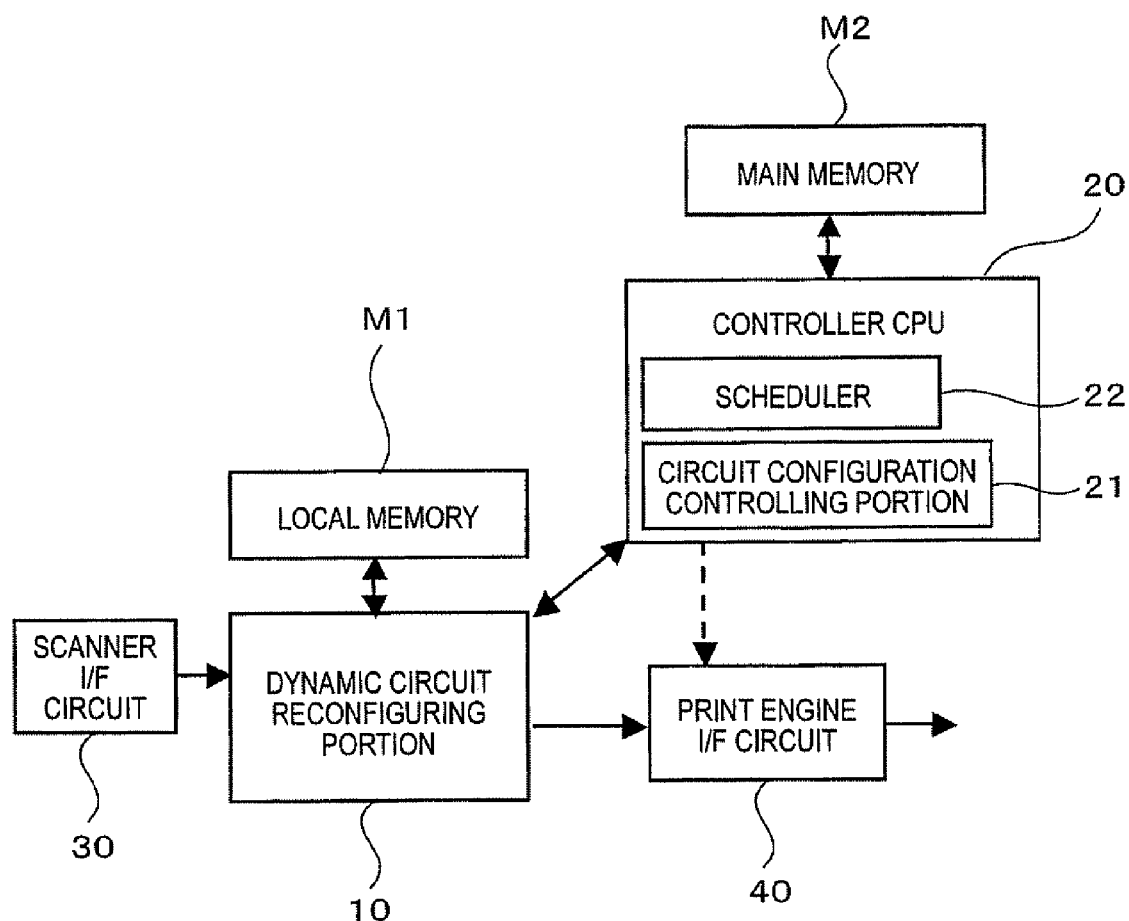
FIG. 1 is a block diagram illustrating the configuration (No. 1) of an image processing apparatus of an exemplary embodiment.

FIG. 1 is a block diagram illustrating the configuration (No. 1) of an image processing apparatus of the exemplary embodiment. The image processing apparatus of the exemplary embodiment includes a dynamic circuit reconfiguring portion 10. In the dynamic circuit reconfiguring portion 10, an internal circuit is reconfigured at a predetermined timing, and, for example, a DRP (Dynamically Reconfigurable Processor) or an FPGA (Field Programmable Gate Array) is used. Preferably, a DRP in which a circuit is reconfigured in units of clock cycles is used.

The dynamic circuit reconfiguring portion 10 is controlled by a controller CPU 20. A circuit configuration controlling portion 21 and a scheduler 22 are disposed in the controller CPU 20. The circuit configuration controlling portion 21 and the scheduler 22 are mounted as software to be implemented by the controller CPU 20.

A local memory M1 is connected to the dynamic circuit reconfiguring portion 10, and a main memory M2 is connected to the controller CPU 20. At least one of the local memory M1 and the main memory M2 stores information of the circuit configured by the dynamic circuit reconfiguring portion 10. A region where the circuit information is to be stored is a circuit configuration storing portion.

When a plurality of image processings are to be performed by parallel processing (multi-task), the scheduler 22 gives instructions such as addressing of circuit information to be stored in the circuit configuration storing portion, and a reconfiguration request, to the dynamic circuit reconfiguring portion 10.

In accordance with instructions from the scheduler 22, the circuit configuration controlling portion 21 reads out information of the circuit configuration stored in the circuit configuration storing portion, and controls the circuit configuration of the dynamic circuit reconfiguring portion 10. For example, the circuit configuration controlling portion reads out information of the configuration of a circuit that singly performs one image processing, and performs a control so as to configure the single image processing circuit, in the dynamic circuit reconfiguring portion 10, or reads out information of the configuration of a circuit that performs a plurality of image processings in parallel, and performs a control so as to configure the circuit that performs parallel processings, in the dynamic circuit reconfiguring portion 10. In response to an image processing request, the circuit configuration controlling portion controls switching between the single image processing circuit and the image processing circuit that performs parallel processings.

A scanner I/F (InterFace) circuit 30 and a print engine I/F (InterFace) circuit 40 are connected to the dynamic circuit reconfiguring portion 10. The scanner I/F circuit 30 performs a processing of sending image information of an original document which is read by an image inputting portion (not shown), to the dynamic circuit reconfiguring portion 10. The print engine I/F circuit 40 performs a processing of sending information for printing supplied from the dynamic circuit reconfiguring portion 10 and the controller CPU 20, to a print engine.

In the configuration of the image processing apparatus shown in FIG. 1, the circuit configuration control performed by the dynamic circuit reconfiguring portion 10 is integrally managed by the controller CPU 20.

[Second Apparatus Configuration]

Figure 2:
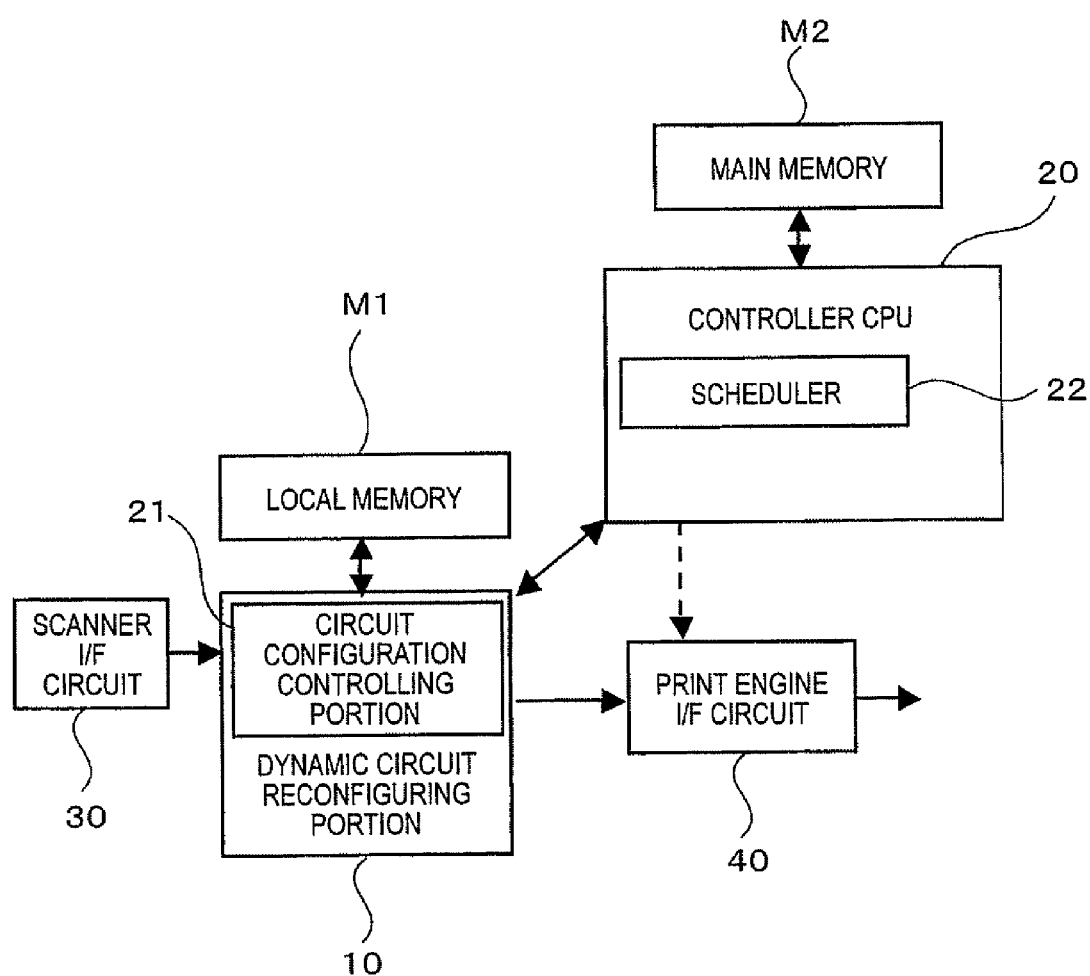
FIG. 2 is a block diagram illustrating the configuration (No. 2) of the image processing apparatus of the exemplary embodiment.

FIG. 2 is a block diagram illustrating the configuration (No. 2) of the image processing apparatus of the exemplary embodiment. In the same manner as the image processing apparatus shown in FIG. 1, the image processing apparatus shown in FIG. 2 includes the dynamic circuit reconfiguring portion 10, the controller CPU 20, the local memory M1, the main memory M2, the scanner I/F circuit 30, and the print engine I/F circuit 40, but is different in that the circuit configuration controlling portion 21 is disposed in the dynamic circuit reconfiguring portion 10.

In the configuration of the image processing apparatus shown in FIG. 2, when a plurality of image processings are to be performed in a multi-task manner, the circuit configuration in the dynamic circuit reconfiguring portion 10 is integrally performed by the circuit configuration controlling portion 21 in the dynamic circuit reconfiguring portion 10. Therefore, the management of the controller CPU 20 is simplified. In the image processing apparatus shown in FIG. 2, during execution of the multi-task processing, information of all circuit configurations including the circuit configuration which is the object of the multi-task processing is resident in the local memory M1.

[Functional Block Configuration]

Figure 3:
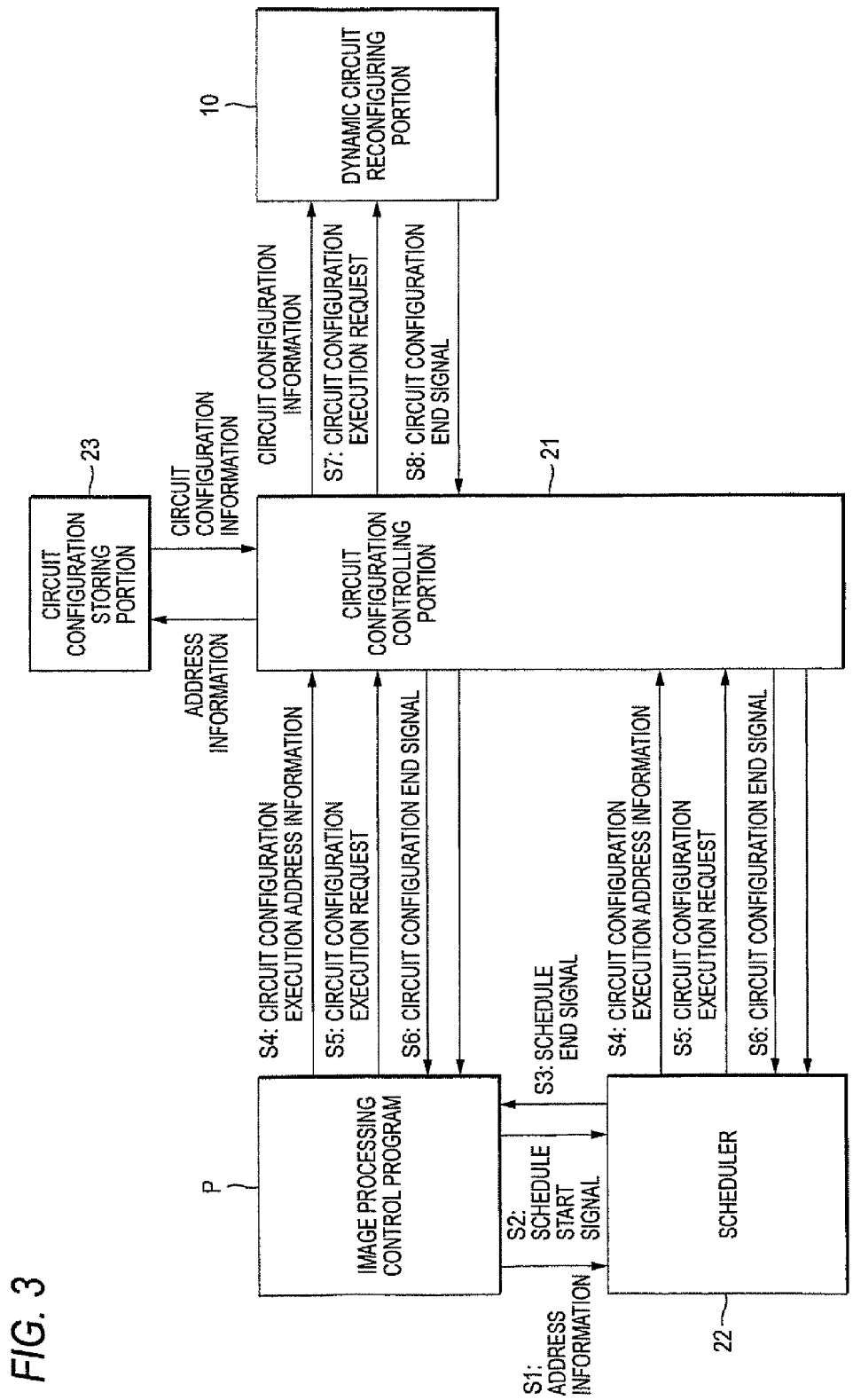
FIG. 3 is a functional block diagram of the image processing apparatus of the exemplary embodiment.

FIG. 3 is a functional block diagram of the image processing apparatus of the exemplary embodiment. Main functions of the image processing apparatus are performed by the dynamic circuit reconfiguring portion 10, the circuit configuration controlling portion 21, the circuit configuration storing portion 23, and the scheduler 22. In the functional block diagram, signal inputs and outputs which are performed while being centered on the circuit configuration controlling portion 21 among the dynamic circuit reconfiguring portion 10, the circuit configuration storing portion 23, the scheduler 22, and an image processing control program P are shown.

Circuit configuration information and a circuit configuration execution request are sent from the circuit configuration controlling portion 21 to the dynamic circuit reconfiguring portion 10, and a circuit configuration end signal is sent from the dynamic circuit reconfiguring portion to the circuit configuration controlling portion. The circuit configuration information is an information indicating the configuration of the circuit configured by the dynamic circuit reconfiguring portion 10. The circuit configuration execution request is a signal requesting execution of the circuit configuration based on the circuit configuration information which is sent to the dynamic circuit reconfiguring portion 10. The circuit configuration end signal is a signal indicating that the circuit configuration and image processing in the dynamic circuit reconfiguring portion 10 is ended.

Address information is sent from the circuit configuration controlling portion 21 to the circuit configuration storing portion 23, and circuit configuration information is sent from the circuit configuration storing portion 23 to the circuit configuration controlling portion 21. The address information in an information indicating the storage place for the circuit configuration to be stored in the circuit configuration storing portion 23. The circuit configuration information in an information for the circuit configuration stored in the storage place which is indicated by the address information.

The circuit configuration end signal is sent from the circuit configuration controlling portion 21 to the scheduler 22 and the image processing control program P, and circuit configuration execution address information and a circuit configuration execution request are sent from the scheduler 22 and the image processing control program P to the circuit configuration controlling portion 21.

Address information and a scheduler start signal are sent from the image processing control program P to the scheduler 22, and a scheduler end signal is sent from the scheduler 22 to the image processing control program P.

The address information of the circuit configuration which is the object of the multi-task processing is address information of a plurality of circuit configurations which are to be executed in the multi-task processing. The circuit configuration end signal is a signal indicating that the execution of the circuit configuration requested by the scheduler 22 is ended. The scheduler start signal is a signal requesting start of execution of the scheduler 22. The circuit configuration execution address information is address information of the circuit configuration selected by the scheduler 22. The circuit configuration execution request is a signal indicating that the scheduler 22 and the image processing control program P set address information of the circuit configuration in the circuit configuration controlling portion 21. The scheduler end signal is a signal indicating that the scheduling of the requested multi-task processing is completed.

<2. Comparative Example>

[No. 1]

Figure 4:
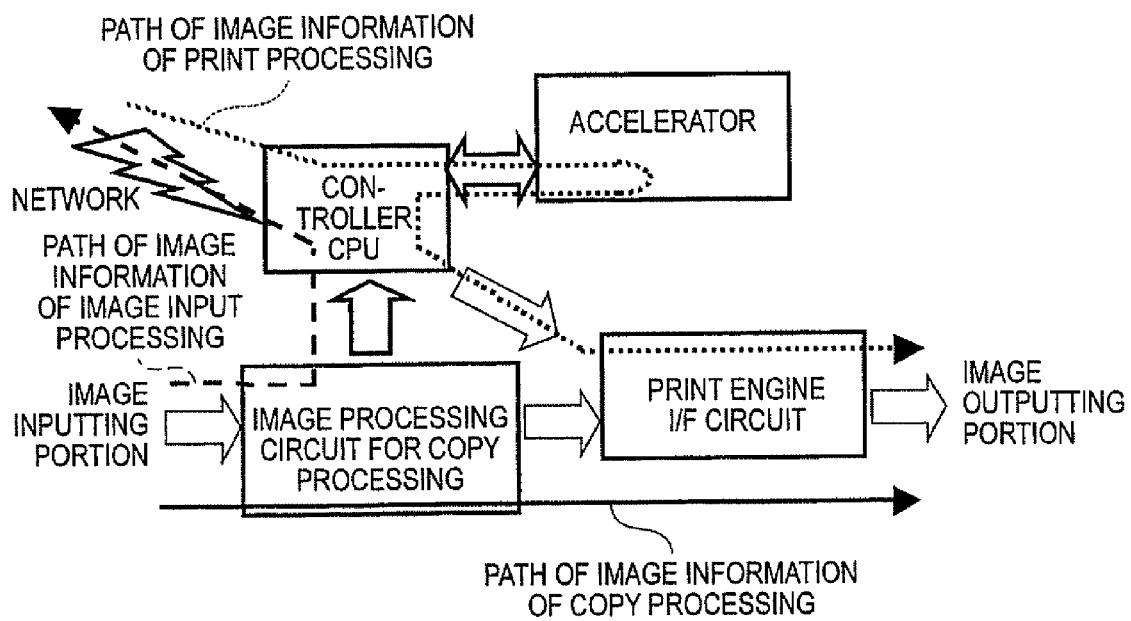
FIG. 4 is a block diagram illustrating a comparative example (No. 1)

FIG. 4 is a block diagram illustrating a comparative example (No. 1). The comparative example (No. 1) includes an image processing circuit for a copy processing, a controller CPU, an accelerator, and an interface to an image outputting apparatus.

In the image processing apparatus of the comparative example (No. 1), image processings of the functions are performed in the following manners.

(1) Copy processing: with respect to image information input from the image inputting portion, the image processing circuit for a copy processing performs color space conversion, filter, TI (Text and Image) separation, adaptive filter, enlargement/reduction (for example), YMCK conversion, screen processing, and the like by pipeline processing, and outputs the results to an image outputting portion.

(2) Image input processing: after the image information input from the image inputting portion is processed up to enlargement/reduction by the image processing circuit for a copy processing, the image information is compressed and then transmitted to the controller CPU, and subjected to a processing of producing the image information of an output format (for example, PDF), and the image information which has been produced into the output format is transmitted to an external terminal (a computer or the like) through a network.

(3) Print processing: the page description language which is input from the network is interpreted by the controller CPU, rasterizing, YMCK conversion, screen processing, and the like are performed by using the accelerator, and then the image information is compressed and output to the image outputting portion.

In the image processing apparatus of the comparative example (No. 1), in accordance with increase of functions, the amount of hardware configuration is increased, and redundancy in execution of a plurality of image processings in parallel is generated.

[No. 2]

Figure 5:
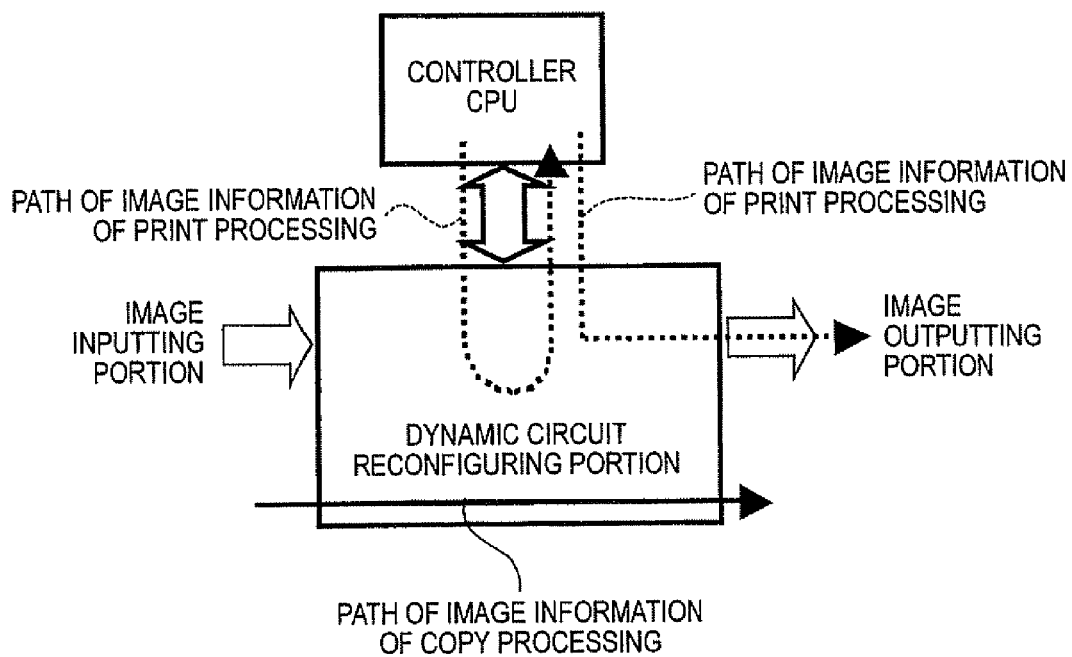
FIG. 5 is a block diagram illustrating a comparative example (No. 2)

FIG. 5 is a block diagram illustrating a comparative example (No. 2). The comparative example (No. 2) includes the dynamic circuit reconfiguring portion and the controller CPU. A DPR or an FPGA is used as the dynamic circuit reconfiguring portion.

In the image processing apparatus of the comparative example (No. 2), when the copy processing is requested, a circuit corresponding to the copy processing is configured by the dynamic circuit reconfiguring portion, and, when the print processing is requested, a circuit corresponding to the print processing is configured by the dynamic circuit reconfiguring portion.

When the circuit configuration is constructed in accordance with the requested processing, the amount of hardware configuration will be decreased. In the case where the dynamic circuit reconfiguring portion is configured by a DPR, reconfiguration requires nanoseconds, and, in the case of an FPGA, reconfiguration requires milliseconds. Therefore, a DPR is preferred. According to the configuration, in the print processing, the circuit configuration is switched over in the unit of drawing object.

In the image processing apparatus of the comparative example (No. 2), it is difficult to execute a plurality of image processings in parallel. In order to reduce the hardware scale, the dynamic circuit reconfiguring portion is restricted to one, and hence parallelism of the processings is hardly attained.

In the case where a request for a print processing is issued during execution of a copy processing, for example, the productivity of the copy processing cannot be reduced as a result of processing parallelism because the real-timeness is requested in the copy processing. Therefore, the print processing is caused to wait until the copy processing is ended.

<3. Basic Operation of Exemplary Embodiment>

Figure 6:
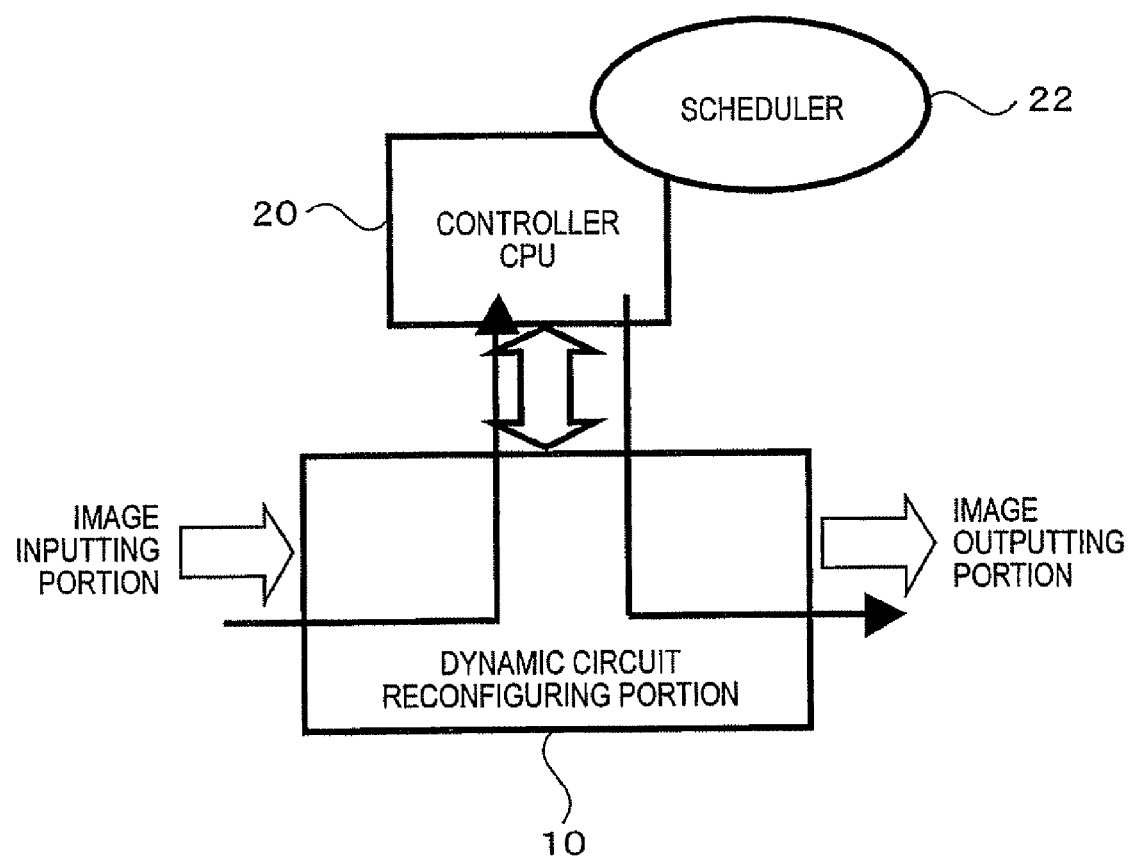
FIG. 6 is a block diagram illustrating the basic operation of the image processing apparatus of the exemplary embodiment.

FIG. 6 is a block diagram illustrating the basic operation of the image processing apparatus of the exemplary embodiment. The exemplary embodiment is identical with the comparative example (No. 2) shown in FIG. 5, in that the apparatus includes the dynamic circuit reconfiguring portion 10 and the controller CPU 20, but different therefrom in that a multi-task processing is realized by the scheduler 22 executed by the controller CPU 20.

Specifically, only when a multi-task processing of performing a plurality of image processings in parallel occurs, the image processing in the copy processing is changed to a compress processing. In the controller CPU 20, multi-tasking by the scheduler 22 is scheduled, and a plurality of circuit configurations corresponding to a plurality of image processings are constructed by the dynamic circuit reconfiguring portion 10. In the case where requests for a copy processing and a print processing are received, for example, scheduling of switching between a first multi-tasking circuit configuration including a circuit of compressing image information, and a second multi-tasking circuit configuration including a compressing circuit is executed. According to the configuration, synchronization (real-timeness) with the image inputting portion in the image processing in the copy processing is ensured, and also a multi-task processing (processing parallelism) by the scheduler is attained. In a process other than the parallel processing of a plurality of image processings, such as the image processing in the copy processing, the processing time is shortened by singly structuring a circuit function of a copy processing.

<4. Basic Configuration of Exemplary Embodiment>

Figure 7:
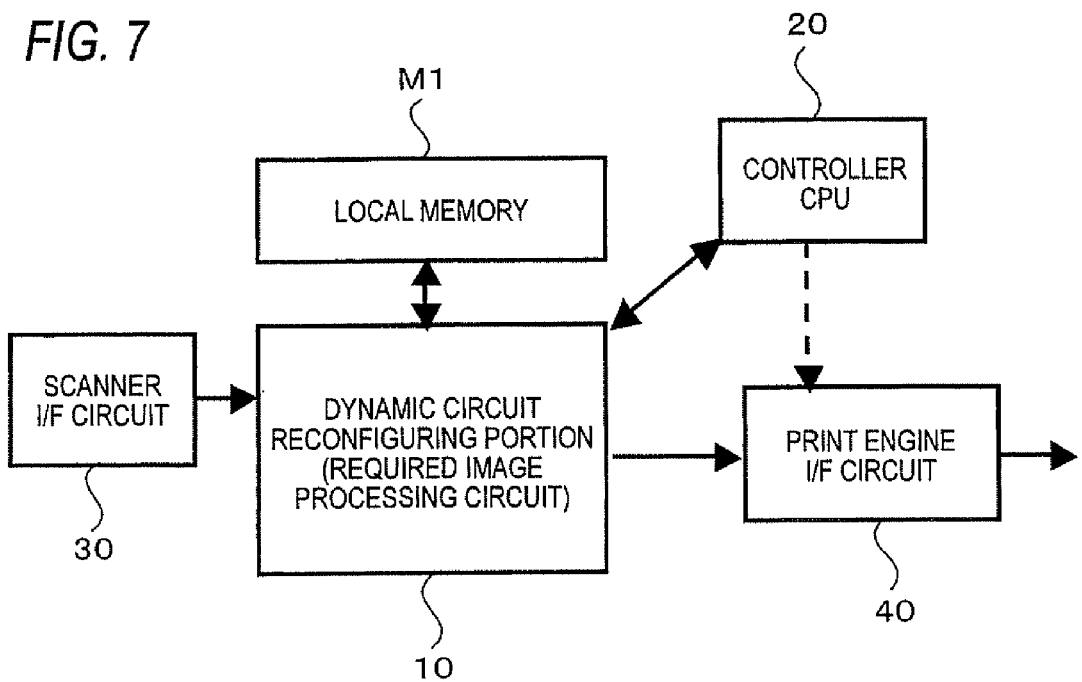
FIG. 7 is a block diagram illustrating the basic configuration of the image processing apparatus of the exemplary embodiment.

FIG. 7 is a block diagram illustrating the basic configuration of the image processing apparatus of the exemplary embodiment. In the image processing apparatus of the exemplary embodiment, the scanner I/F circuit 30, the print engine I/F circuit 40, the local memory M1, and the controller CPU 20 are disposed about the dynamic circuit reconfiguring portion 10. In the dynamic circuit reconfiguring portion 10, circuits of required image processings (for example, a copy processing, a print processing, and an image input processing) are dynamically configured.

In the configuration of the image processing apparatus of the exemplary embodiment, when the multi-task request is ended, the apparatus is promptly controlled so as to perform a single task. In the case where, during image processings for a copy processing and a print processing are performed in a multi-task processing, the print processing is ended, a single-task processing of the copy processing is promptly configured. This causes the copy processing to be performed at the maximum performance.

The block configuration other than the dynamic circuit reconfiguring portion 10 may be formed as a stationary circuit or a dynamic circuit. In a print processing, image information is directly output from the controller CPU 20 to the print engine I/F circuit 40.

<5. Specific Operation>

[Copy Processing]

Figure 8:
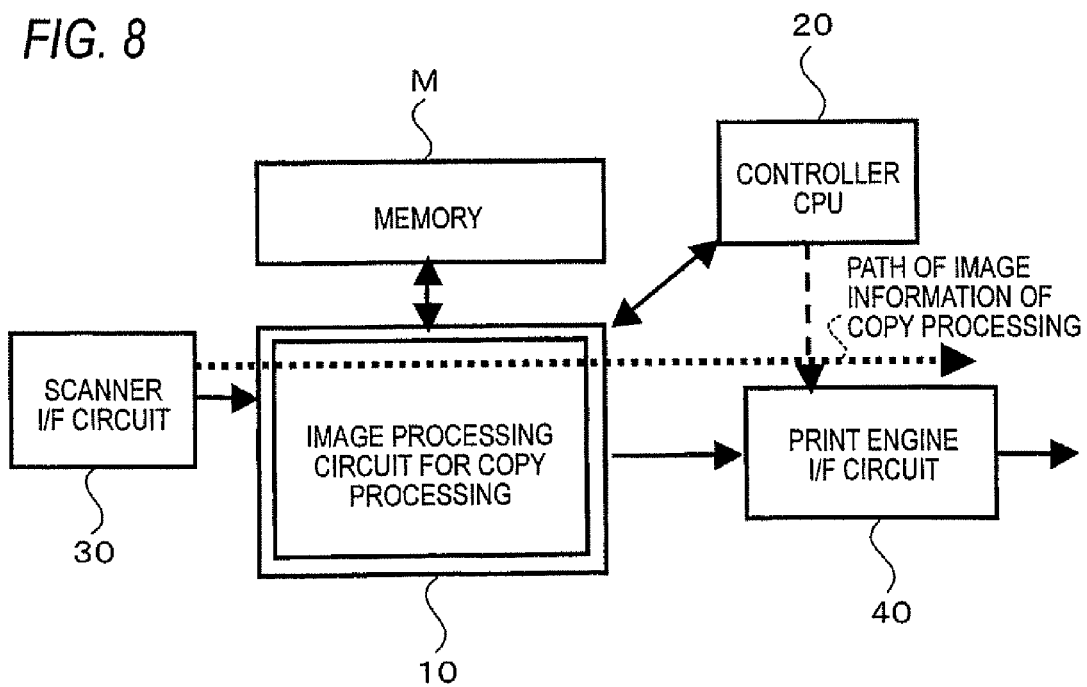
FIG. 8 is a block diagram illustrating the operation in the case where a copy processing is performed.

FIG. 8 is a block diagram illustrating the operation in the case where a copy processing is performed. In the case where a copy processing is to be performed, an image processing circuit for a copy processing is configured in the dynamic circuit reconfiguring portion 10. Image information which is input by a scanner functioning as an image inputting portion is sent to the dynamic circuit reconfiguring portion 10 through the scanner I/F circuit 30. The image processing relating to the copy processing is performed on the image information by the thus configured image processing circuit for a copy processing, and the image information is then supplied to the print engine I/F circuit 40. The copy processing is performed by the single circuit configuration so that the processing time is shortened.

[Print Processing]

Figure 9:
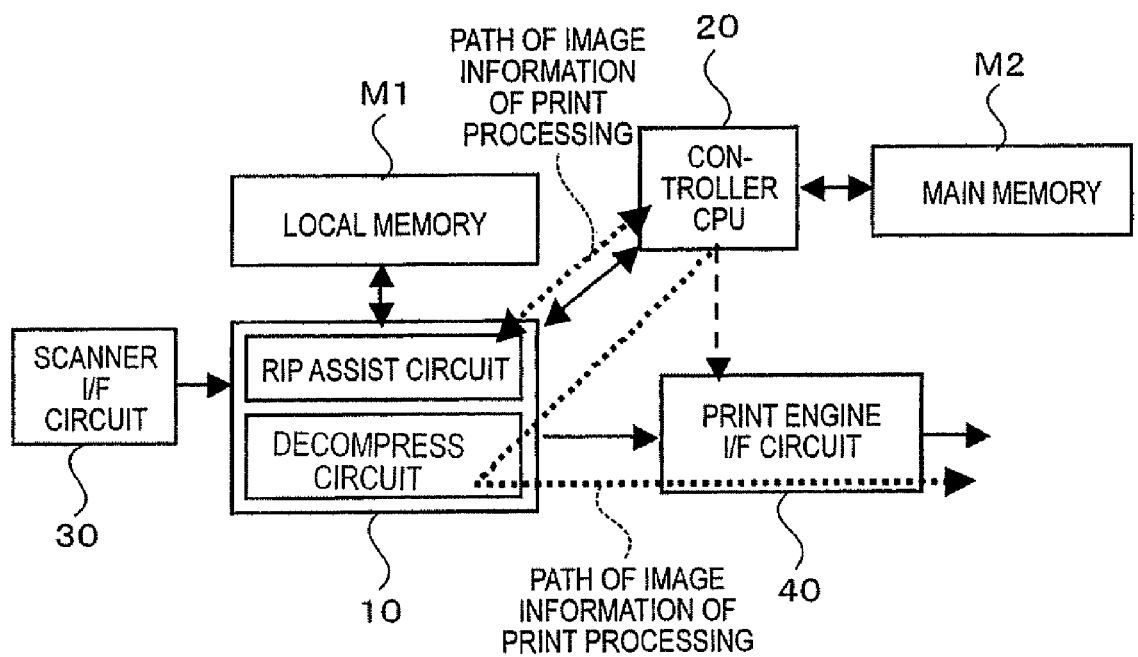
FIG. 9 is a block diagram illustrating the operation in the case where a print processing is performed.

FIG. 9 is a block diagram illustrating the operation in the case where a print processing is performed. In the case where a print processing is to be performed, an RIP (Raster Image Processing) assist circuit and a decompress circuit are configured in the dynamic circuit reconfiguring portion 10. The RIP assist circuit performs an image processing on an image included in the page description language which is supplied from the outside. The decompress circuit performs a processing of expanding information in which RIP has been completed in the previous page. As described above, in the print processing, image information may be directly output from the controller CPU 20 to the print engine I/F circuit 40.

[Copy Processing and Print Processing]

Figure 10A:
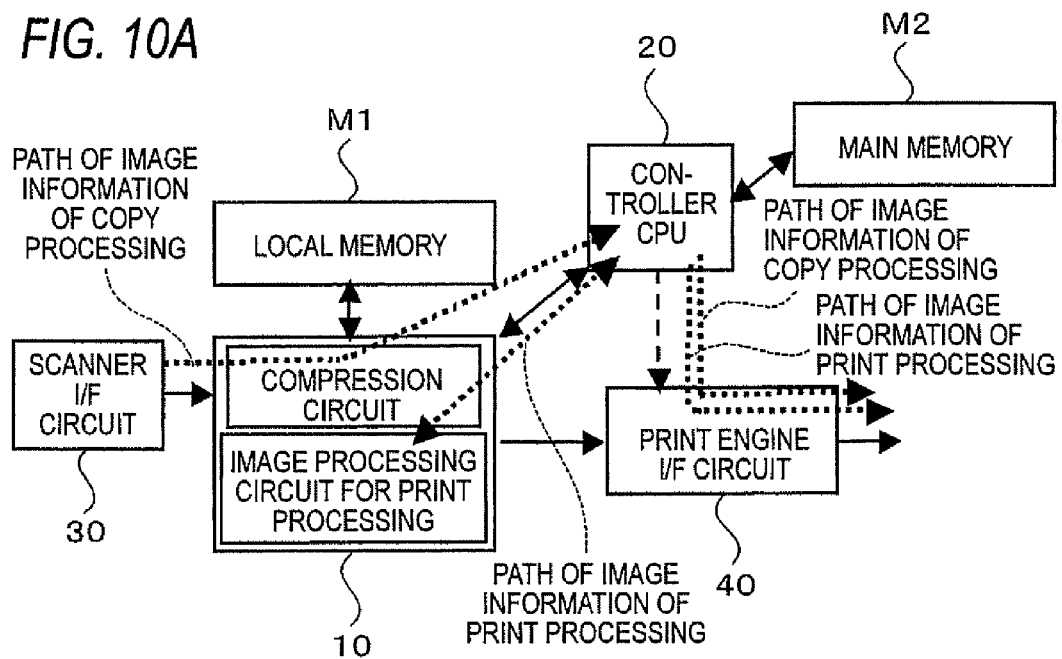
FIGS. 10A and 10B are block diagrams illustrating the operation in the case where a copy processing and a print processing are performed in a multi-task manner.
Figure 10B:
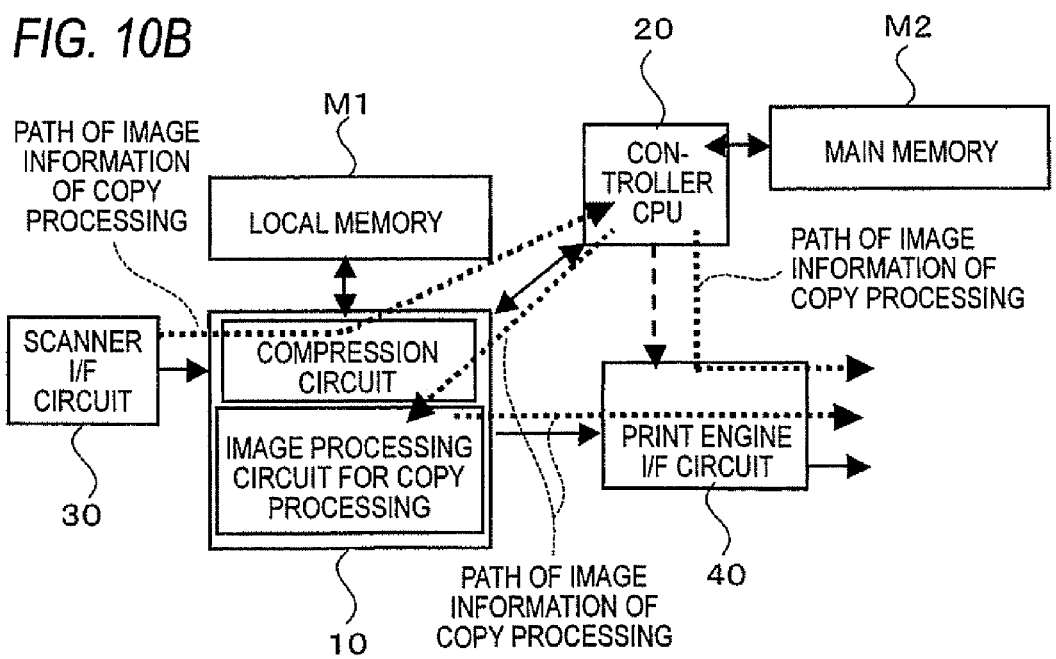

FIGS. 10A and 10B are block diagrams illustrating the operation in the case where a copy processing and a print processing are performed in a multi-task manner. In the case where a copy processing and a print processing is to be performed in a multi-task processing, an operation of switching between a first circuit configuration in which a compression circuit and an image processing circuit (for example, an RIP assist circuit) for the print processing are configured, and a second circuit configuration in which a compression circuit and an image processing circuit for the copy processing are configured is performed in the dynamic circuit reconfiguring portion 10.

FIG. 10A is a diagram showing the first circuit configuration. In the first circuit configuration, the compression circuit for image information and the image processing circuit for the print processing are constructed in the dynamic circuit reconfiguring portion 10. In the case where the first circuit configuration is constructed, in the copy processing, image information which is input by the scanner functioning as an image inputting portion is sent to the compression circuit through the scanner I/F circuit 30. The image information which is compressed by the compression circuit is sent to the controller CPU 20, and then image processings for the copy processing and the print processing are performed in a multi-task processing by the scheduler. The compressed image information is sent to the controller CPU 20 because the band width of a bus is restricted.

By contrast, in the print processing, image information (image data) included in the page description language which is supplied from the outside is sent from the controller CPU 20 to the image processing circuit for the print processing which is configured in the dynamic circuit reconfiguring portion 10. Here, information in which RIP has been completed is supplied from the controller CPU 20 to the print engine I/F circuit 40. In the output of the print processing, the sequence with respect to the output of the copy processing is controlled by scheduler.

FIG. 10B is a diagram showing the second circuit configuration. In the second circuit configuration, the compression circuit for image information and the image processing circuit for the copy processing are constructed in the dynamic circuit reconfiguring portion 10. In the case where the second circuit configuration is constructed, in the copy processing, image information which is input by the scanner functioning as an image inputting portion is sent to the compression circuit through the scanner I/F circuit 30. The image information which is compressed by the compression circuit is sent to the controller CPU 20, and then image processings for the copy processing and the print processing are performed in a multi-task processing by the scheduler.

The compressed image information which is sent to the controller CPU 20 is further sent from the controller CPU 20 to the image processing circuit for the copy processing, undergone the decompress process, and then supplied to the print engine I/F circuit 40.

In the exemplary embodiment, the first circuit configuration and the second circuit configuration are switched over by the scheduler which will be described later, and executions of the different multi-task circuits are scheduled.

<6. Image Processing Control Program: Circuit Reconfiguring Control and Scheduler>

[Circuit Reconfiguring Control]

Figure 11:
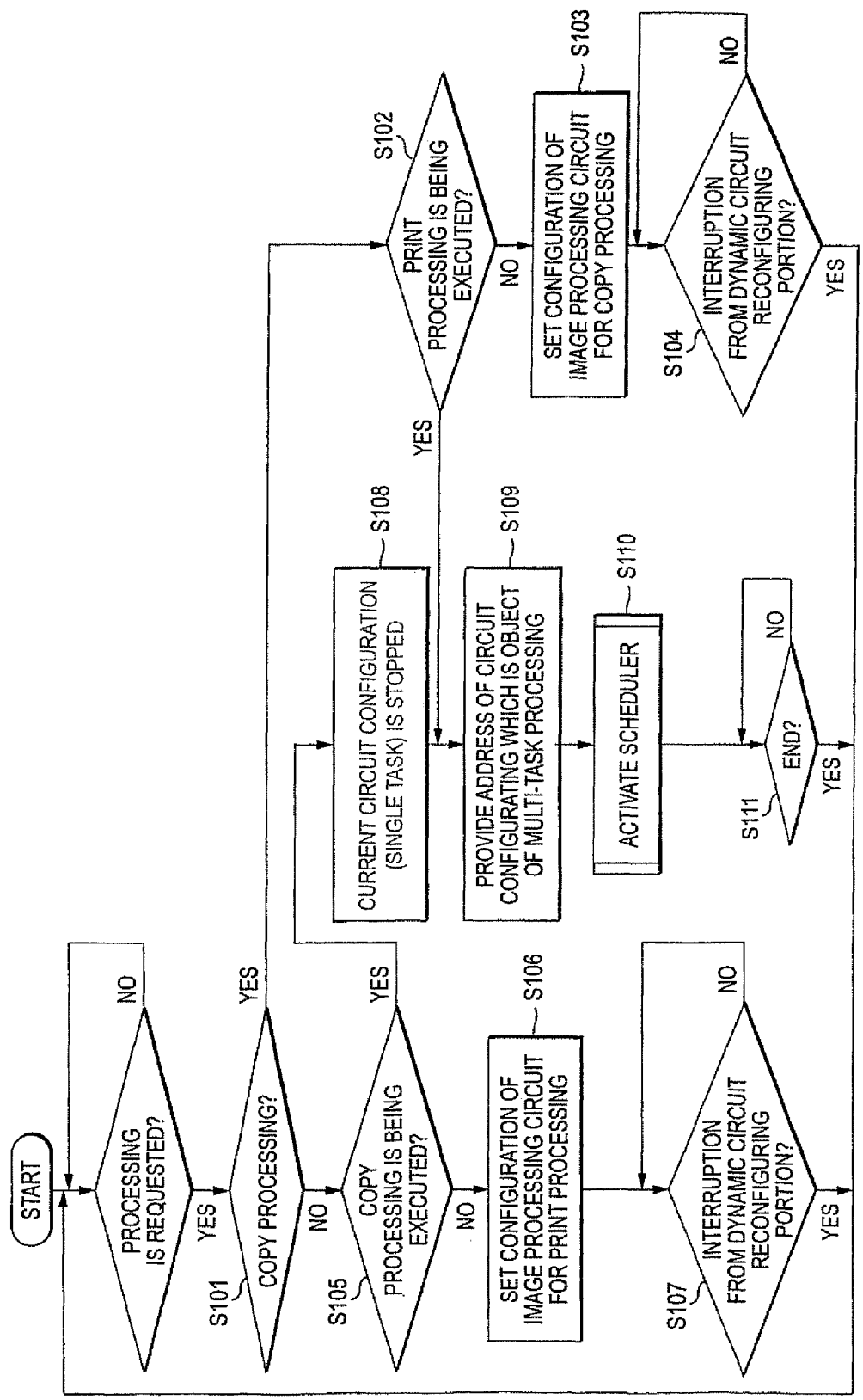
FIG. 11 is a flowchart illustrating a circuit reconfiguring control in an image processing control program in the exemplary embodiment.

FIG. 11 is a flowchart illustrating a circuit reconfiguring control in an image processing control program in the exemplary embodiment. The image processing control program in the exemplary embodiment is configured by steps to be executed by the circuit configuration controlling portion of the controller CPU of the image processing apparatus shown in FIG. 1, or those to be executed by the dynamic circuit reconfiguring portion 10. As shown in FIG. 3, the image processing control program performs operations of inputting and outputting signals between the circuit configuration controlling portion 21 and the scheduler 22, and controls them. The image processing control program may be recorded on a record medium which is managed by the controller CPU, such as a nonvolatile memory or a hard disk (both are not shown), or a CD-ROM, or distributed via a network.

In the following description with reference to the flowcharts, also the functional block diagram of FIG. 3 is referred together with the flowcharts. In order to simplify the description, the description of the image input processing is omitted.

First, if a request for an image processing is received, the image processing control program determines whether the requested process is the copy processing or not (step S101). If the requested process is the copy processing, it is determined whether the print processing is being executed or not (step S102).

If the print processing is not being executed, it is determined that the copy processing is to be singly performed, and the circuit configuration for performing the image processing for the copy processing is set in the dynamic circuit reconfiguring portion 10, and the processing is executed (step S103). Namely, the image processing control program sends information of the address where circuit configuration information for the copy processing is stored, to the circuit configuration storing portion 23 through the circuit configuration controlling portion 21, and reads out the circuit configuration information for the copy processing from the circuit configuration storing portion 23. Then, the circuit configuration information is set in the dynamic circuit reconfiguring portion 10. Based on the set circuit configuration information, the dynamic circuit reconfiguring portion 10 forms the circuit configuration for the copy processing, and, when receiving the circuit configuration execution request S7 from the circuit configuration controlling portion 21, executes the copy processing. When the circuit configuration controlling portion 21 receives the circuit configuration end signal S8 from the dynamic circuit reconfiguring portion 10, the processing is ended (step S104).

By contrast, if it is determined in step S101 that the requested process is not the copy processing (i.e., the print processing is requested), it is determined whether the copy processing is being executed or not (step S105).

If the copy processing is not being executed, it is determined that the print processing is to be singly performed, and the circuit configuration for performing the image processing for the print processing is set in the dynamic circuit reconfiguring portion 10, and the processing is executed (step S106). Namely, the image processing control program sends information of the address where circuit configuration information for the copy processing is stored, to the circuit configuration storing portion 23 through the circuit configuration controlling portion 21, and reads out the circuit configuration information for the print processing from the circuit configuration storing portion 23. Then, the circuit configuration information is set in the dynamic circuit reconfiguring portion 10.

Based on the set circuit configuration information, the dynamic circuit reconfiguring portion 10 forms the circuit configuration for the print processing, and, when receiving the circuit configuration execution request S7 from the circuit configuration controlling portion 21, executes the print processing. When the circuit configuration controlling portion 21 receives the circuit configuration end signal S8 from the dynamic circuit reconfiguring portion 10, the processing is ended (step S107).

If it is determined in step S101 that the requested process is not the copy processing, and it is determined in step S105 that the copy processing is being executed, the current circuit configuration is stopped (step S108), the parallel processing (multi-task) of the copy processing and the print processing is to be performed. If it is determined in step S101 that the requested process is the copy processing, and it is determined in step S102 that the print processing is being executed, the parallel processing (multi-task) of the copy processing and the print processing is to be performed.

In the case where the multi-task processing is to be performed, the circuit configuration for the image processing which is the object of the multi-task processing is set in the dynamic circuit reconfiguring portion 10 (step S109). In this example, as the multi-task image processing, the compression circuit and the circuit for the print processing are set in the dynamic circuit reconfiguring portion 10.

Specifically, the address information S1 of the circuit configuration which is the object of the multi-task processing (for example, the address information of the first circuit configuration constituting the compression circuit and the image processing circuit for the print processing, and the second circuit configuration constituting the compression circuit and the image processing circuit for the copy processing) is sent from the image processing control program P to the scheduler 22, and the scheduled circuit configuration execution address information S4 is obtained from the scheduler 22 to the circuit configuration controlling portion 21. Based on this, the circuit configuration controlling portion 21 sends the address information to the circuit configuration storing portion 23, reads out the circuit configuration information which is the object of the multi-task processing, and sets the information into the dynamic circuit reconfiguring portion 10. On the basis of the set circuit configuration information, the dynamic circuit reconfiguring portion 10 forms the circuit configuration which is the object of the multi-task processing (in this example, the compression circuit and the circuit for the print processing).

Next, the scheduler 22 is activated (step S110). The activation of the scheduler 22 is performed by sending the scheduler start signal S2 from the image processing control program P to the scheduler 22. When the scheduler 22 is activated, the scheduler 22 sends the circuit configuration execution request S7 to the dynamic circuit reconfiguring portion 10 through the circuit configuration controlling portion 21. The dynamic circuit reconfiguring portion 10 receives the request, and then performs the multi-task processing. Thereafter, the processing is ended at a stage where an interruption due to the scheduler end signal S3 is caused in the image processing control program P by the multi-task scheduler 22 (step S111).

[Scheduler Control]

Hereinafter, first and second examples of the control performed by the scheduler will be described.

FIRST EXAMPLE

Figure 12:
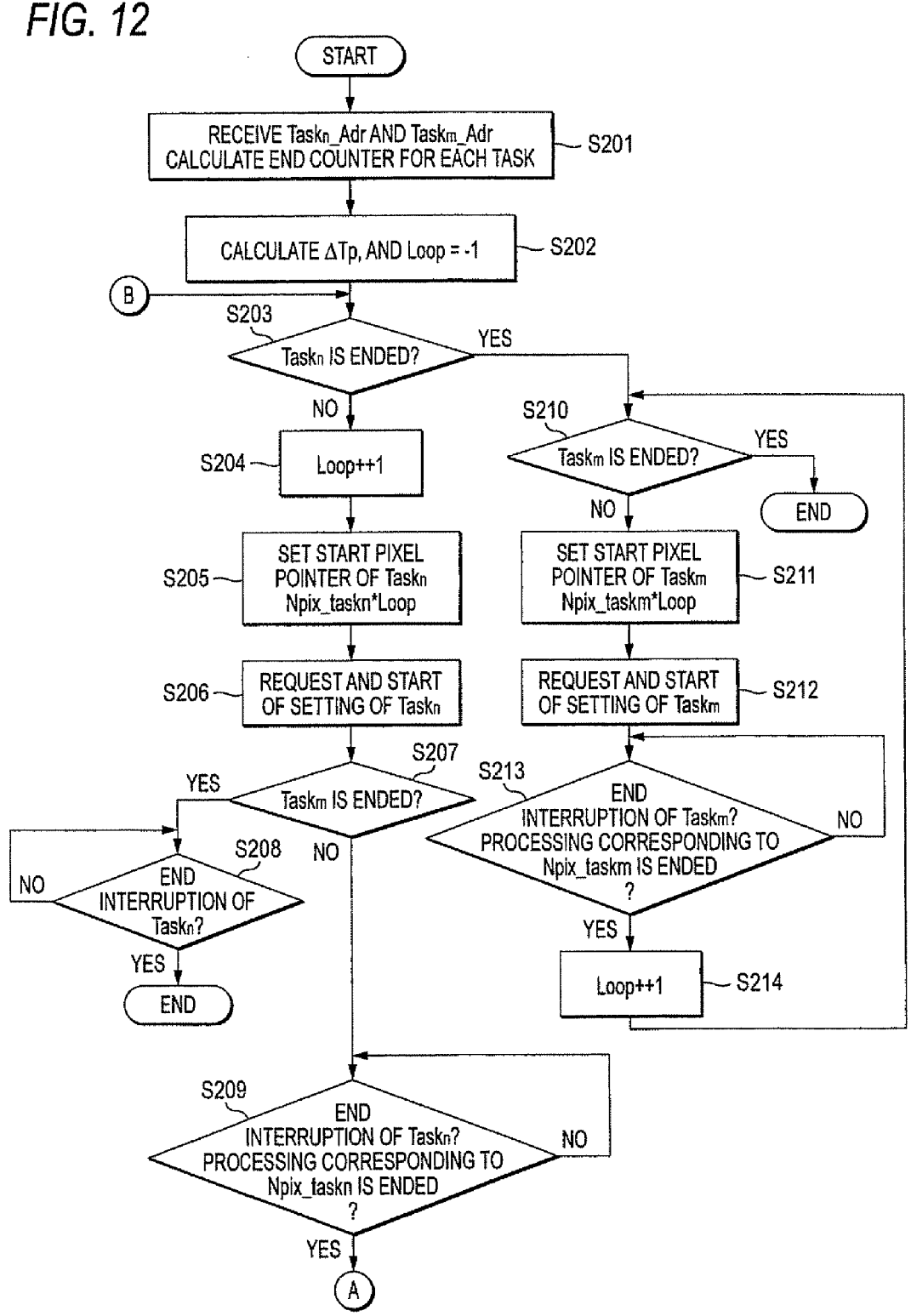
FIG. 12 is a flowchart (No. 1) of a control performed by a scheduler.
Figure 13:
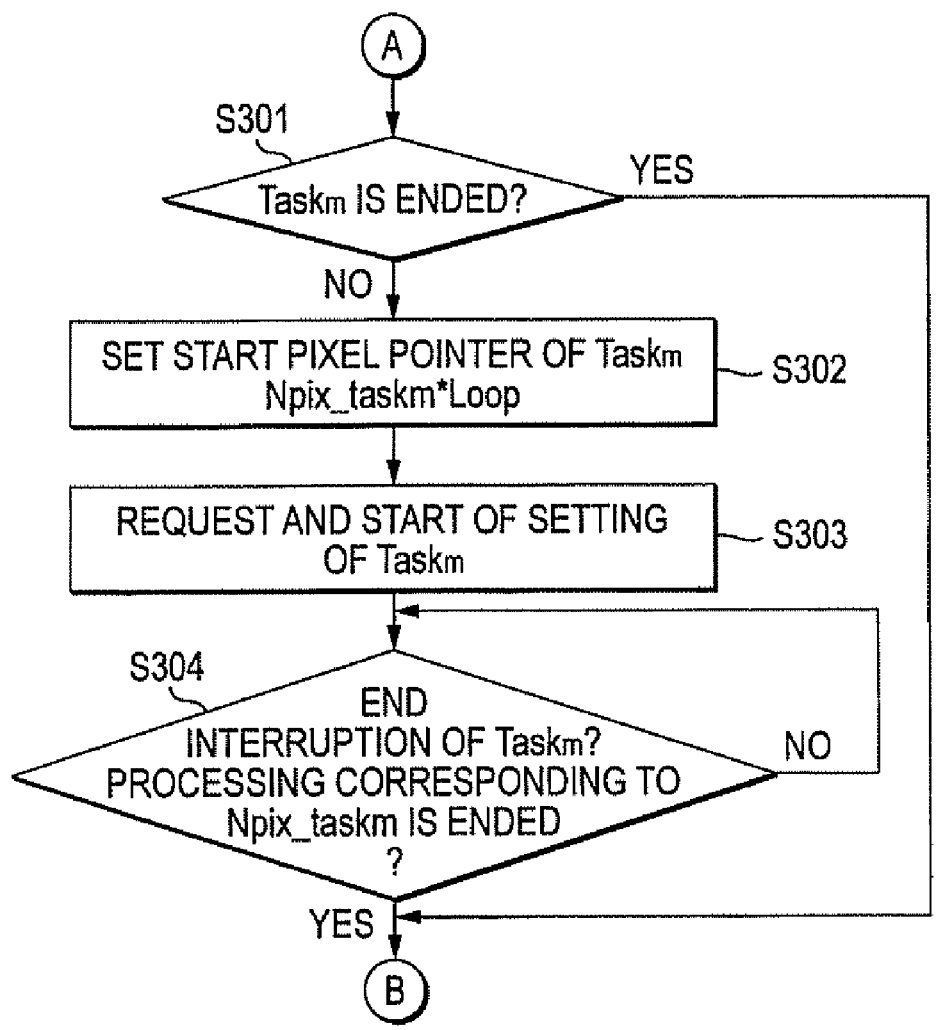
FIG. 13 is a flowchart (No. 2) of the control performed by the scheduler.

FIGS. 12 and 13 are flowcharts of the control performed by the scheduler in the first example. The control shown in the flowchart is conducted immediately before the start of the multi-task processing. In the case where, during execution of one image processing, another image processing is requested, the scheduler 22 inserts the other image processing which is the subsequent processing, into the one image processing which is the current processing, in a range which does not exceed a first threshold (multi-tasking).

In the case where the subsequent image processing cannot be inserted in the range which does not exceed the first threshold, the scheduler 22 preferentially executes the one image processing which is the current processing, and then exceeds the other image processing which is the subsequent processing.

The terms which are used in the multi-tasking will be described. When the time allocated to one execution of the copy processing task is indicated by Slot_Cl, and a coefficient for expanding the original (single task) processing time is indicated by Cd, the total of the original processing time is $\Sigma\text{Slot\_Cl}$.

Therefore, the increment of the processing time is indicated by $\Delta\text{Tcp}=(\Sigma\text{Slot\_Cl})\times(\text{Cd}-1.0)$. Hereinafter, $\Delta\text{Tcp}$ is referred to as the first threshold. Namely, $\Delta\text{Tcp}$ of the copy processing task is an allowable increment of the processing time.

In the case where 100 sheets are to be processed in the copy image processing of 60 sheets per minute, for example, the processing time $\Sigma\text{Slot\_Cl}$ is 100 sec. In the case where Cd is 1.5, the allowable processing time is 100 sec.×1.5=150 sec., and $\Delta\text{Tcp}$ is 50 sec. In the case where Cd is about 1.5, namely, the increment which is the waiting time of the copy processing is not problematic.

Next, the control flow will be described with reference to the flowcharts of FIGS. 12 and 13. In the following description, "n" is a variable indicating an integer of 1 or more. As shown in FIG. 12, first, a request ($\text{Task}_n\_\text{Adr}$) for the current image processing and a request ($\text{Task}_m\_\text{Adr}$) for the subsequent image processing are received (step S201). Namely, the scheduler 22 receives the address information S1 of a plurality of circuit configurations from the circuit configuration controlling portion 21. Furthermore, an end counter for each task is calculated. The calculation of the end counter will be described later.

Next, $\Delta\text{Tp}$ is calculated (step S202). Then, it is determined whether $\text{Task}_n$ is ended or not (step S203). If $\text{Task}_n$ is ended, the process proceeds to step S210. The processing including and subsequent to step S210 will be described later. If $\text{Task}_n$ is not ended, a loop counter Loop is incremented (step S204).

Next, a start pixel pointer of $\text{Task}_n$ is set, and Npix_taskn is calculated (step S205). Execution address information S5 of $\text{Task}_n$ is sent to the circuit configuration controlling portion 21 (step S206). Thereafter, it is determined whether $\text{Task}_m$ is ended or not (step S207). If $\text{Task}_m$ is ended, it is determined whether an end interruption of $\text{Task}_n$ is provided or not (step S208). If the end interruption is provided, the processing is ended.

By contrast, if $\text{Task}_m$ is not ended, it is determined whether the end interruption of $\text{Task}_n$ is provided or not, or whether the processing corresponding to Npix_taskn is ended or not (step S209). If the end interruption of $\text{Task}_n$ is provided or the processing corresponding to Npix_taskn is ended, the process is transferred to the processing shown in FIG. 13.

If it is determined in step S203 that $\text{Task}_n$ is ended, the process proceeds to step S210. First, it is determined whether $\text{Task}_m$ is ended or not (step S210). If $\text{Task}_m$ is ended, the processing is ended. By contrast, if $\text{Task}_m$ is not ended, a start pixel pointer of $\text{Task}_m$ is set, and Npix_taskm is calculated (step S211). Execution address information S5 of $Task_m$ is sent to the circuit configuration controlling portion 21 (step S212).

Thereafter, it is determined whether the end interruption of $Task_m$ is provided or not, or whether the processing corresponding to Npix_taskm is ended or not (step S213). If the end interruption of $Task_m$ is provided or the processing corresponding to Npix_taskm is ended, the process is returned to the processing of step S210.

If it is determined in step S209 that the end interruption of $Task_n$ is provided or the processing corresponding to Npix_taskn is ended, the process is transferred to the processing shown in FIG. 13. First, it is determined whether $Task_m$ is ended or not (step S301). If $Task_m$ is ended, the process returns to step S203 shown in FIG. 12. If $Task_m$ is not ended, the start pixel pointer of $Task_m$ is set, and Npix_taskm is calculated (step S302). The execution address information S5 of $Task_m$ is sent to the circuit configuration controlling portion 21 (step S303).

Then, it is determined whether the end interruption of $Task_m$ is provided or not, or whether the processing corresponding to Npix_taskm is ended or not (step S304). If the end interruption of $Task_m$ is provided or the processing corresponding to Npix_taskm is ended, the process is returned to the processing of step S203 shown in FIG. 12.

Figure 14:
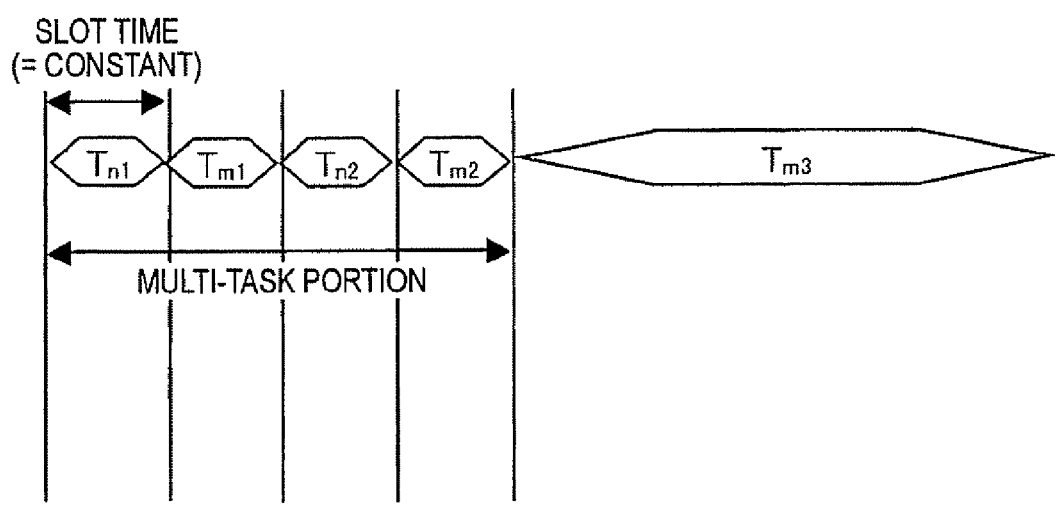
FIG. 14 is a view illustrating the flow of a change of $\Delta Tp$ by grasping of effects of a multi-task processing.

FIG. 14 is a view schematically illustrating processings of tasks in the first example. The Slot time is indicated by S, the Slot execution unit of $Task_n$ is indicated by nx, the processing time of $Task_n$ is indicated by $T_n$, and it is assumed that $T_n = S \times 2$ and $T_m = S \times 2 + \alpha$ ($\alpha$ is a sufficiently large value). In the first example, then, the scheduling result is as shown FIG. 14.

In FIG. 14, $Task_n$ is indicated as $T_n$, and $Task_m$ is indicated as $T_m$. In a multi-task portion shown in FIG. 14, in the switching between the first and second circuit configurations which constitute a multi-task processing, a circuit for executing $Task_n$ is set in the first circuit configuration, and that for executing $Task_m$ is set in the second circuit configuration.

In the first example, the Slot times of the tasks are equal to each other. When a multi-task processing is configured, therefore, $T_n$ may be processed. However, a multi-task processing is insufficient for processing of $T_m$, and hence a single processing (the portion of $T_{m3}$) occurs. Therefore, the first example has an effect that $T_n$ (or $T_m$) is preferentially processed.

[Calculation of End Counter]

The processing time in a single task is indicated by Tst, and the allocation time per task in a multi-task processing of $Task_n$ is indicated by Slot_n. Then, the end counter Ctr_$Task_n$ in the circuit configuration is as follows:

$$Ctr\_Task_n = Tst \div Slot\_n.$$

In order to simplify the description, however, it is assumed that Tst is dividable by Slot_n.

When the total number of input pixels is indicated by Npix, the number of pixels which are processed in one task in a multi-task processing of $Task_n$ is as follows:

$$Npix\_Task_n = Npix \div Ctr\_Task_n.$$

Namely, the processing time may be known is not known from a timer, but is known from the pixel number.

[Relationship Between ΔTp and Slot Time]

Figure 15:
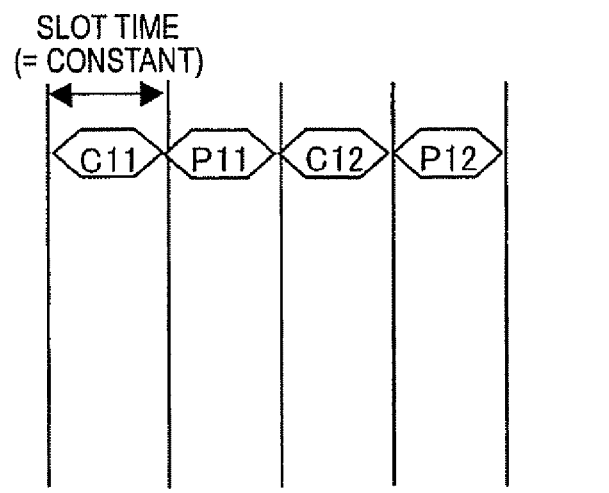
FIG. 15 is a view schematically showing a state where Slots are inserted in the case of a multi-task processing.

FIG. 15 is a view schematically showing a state where Slots of other jobs are always inserted in the case of a multi-task processing. When it is assumed that N indicates the repetition number of Slot and the multiplicity is 2 (two jobs are multiplexed), $Slot \times 2N = Tst + \Delta Tp$ is obtained. Namely, $\Delta Tp = Slot \times 2N - Tst$.

It is assumed that Tst=10, Slot=5, and ΔTp=10. In the case of N=2 (this corresponds to Loop number), i.e., Slot time=5, when a multi-task processing is performed two times, it is settled to ΔTp.

SECOND EXAMPLE

Figure 16:
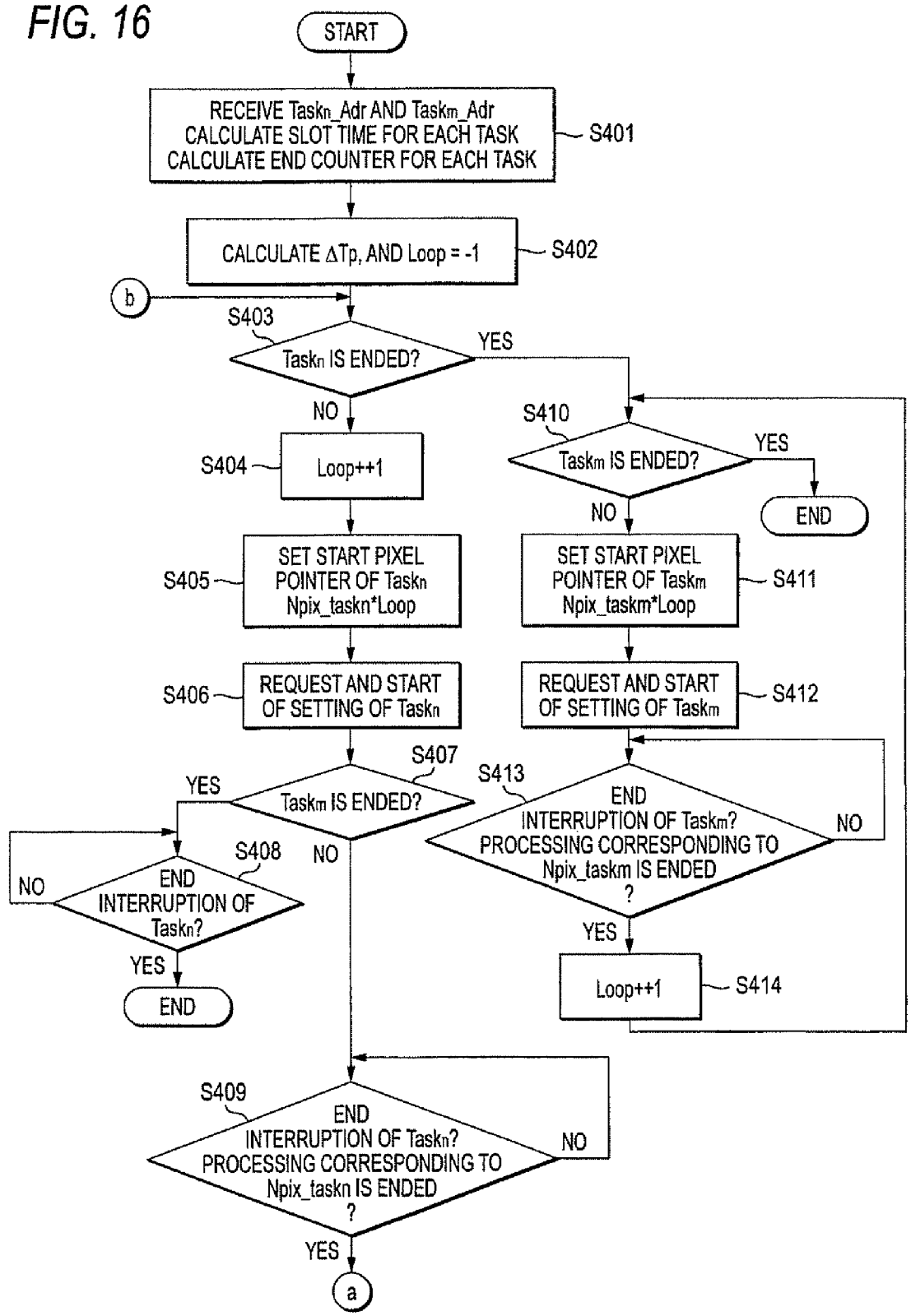
FIG. 16 is a flowchart (No. 1) of a control by a scheduler in a second exemplary embodiment.
Figure 17:
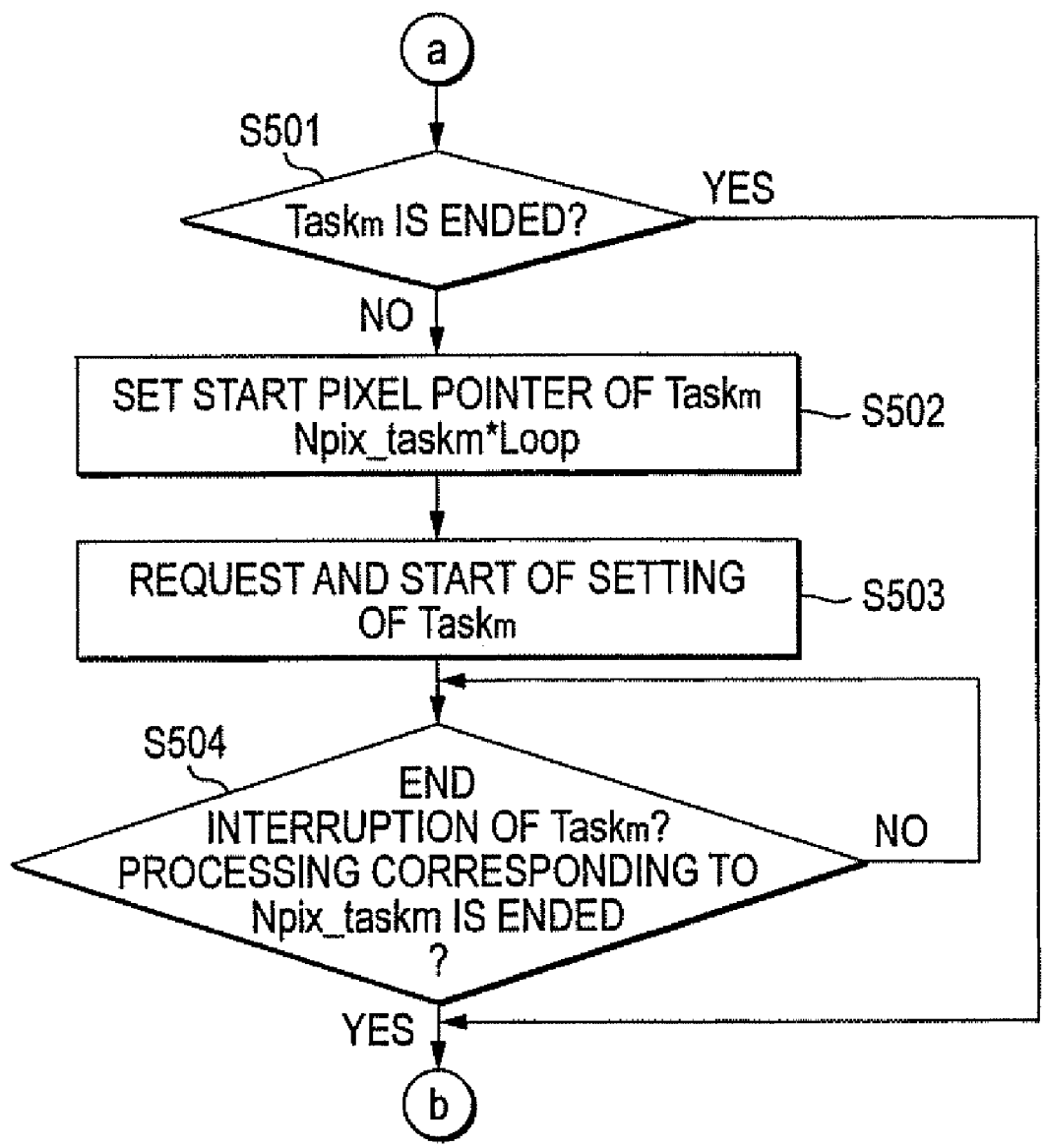
FIG. 17 is a flowchart (No. 2) of a control by the scheduler in the second exemplary embodiment.

FIGS. 16 and 17 are flowcharts of the control by the scheduler in the second example. In the following description, "n" is a variable indicating an integer of 1 or more. As shown in FIG. 16, first, a request ($Task_n$_Adr) for the current image processing and a request ($Task_m$_Adr) for the subsequent image processing are received (step S401). Namely, the scheduler 22 receives the address information S1 of a plurality of circuit configurations from the circuit configuration controlling portion 21. Furthermore, the Slot time for each task and an end counter for each task (see the above description) are calculated. The calculation of the Slot time for each task will be described later.

Next, ΔTp is calculated (step S402). Then, it is determined whether $Task_n$ is ended or not (step S403). If $Task_n$ is ended, the process proceeds to step S410. The processing including and subsequent to step S410 will be described later. If $Task_n$ is not ended, a loop counter Loop is incremented (step S404).

Next, a start pixel pointer of $Task_n$ is set, and Npix_taskn is calculated (step S405). Execution address information S5 of $Task_n$ is sent to the circuit configuration controlling portion 21 (step S406). Thereafter, it is determined whether $Task_m$ is ended or not (step S407). If $Task_m$ is ended, it is determined whether an end interruption of $Task_n$ is provided or not (step S408). If the end interruption is provided, the processing is ended.

By contrast, if $Task_m$ is not ended, it is determined whether the end interruption of $Task_n$ is provided or not, or whether the processing corresponding to Npix_taskn is ended or not (step S409). If the end interruption of $Task_n$ is provided or the processing corresponding to Npix_taskn is ended, the process is transferred to the processing shown in FIG. 17.

If it is determined in step S403 that $Task_n$ is ended, the process proceeds to step S410. First, it is determined whether $Task_m$ is ended or not (step S410). If $Task_m$ is ended, the processing is ended. By contrast, if $Task_m$ is not ended, a start pixel pointer of $Task_m$ is set, and Npix_taskn is calculated (step S411). Execution address information S5 of $Task_m$ is sent to the circuit configuration controlling portion 21 (step S412).

Thereafter, it is determined whether the end interruption of $Task_m$ is provided or not, or whether the processing corresponding to Npix_taskm is ended or not (step S413). If the end interruption of $Task_m$ is provided or the processing corresponding to Npix_taskm is ended, the process is returned to the processing of step S410.

If it is determined in step S409 that the end interruption of $Task_n$ is provided or the processing corresponding to Npix_taskn is ended, the process is transferred to the processing shown in FIG. 17. First, it is determined whether $Task_m$ is ended or not (step S501). If $Task_m$ is ended, the process returns to step S403 shown in FIG. 16. If $Task_m$ is not ended, the start pixel pointer of $Task_m$ is set, and Npix_taskm is calculated (step S502). The execution address information S5 of $Task_m$ is sent to the circuit configuration controlling portion 21 (step S503).

Then, it is determined whether the end interruption of $Task_m$ is provided or not, or whether the processing corresponding to Npix_taskm is ended or not (step S504). If the end interruption of $Task_m$ is provided or the processing corresponding to Npix_taskm is ended, the process is returned to the processing of step S403 shown in FIG. 16.

[Calculation of Slot Time for Each Task]

Figure 18:
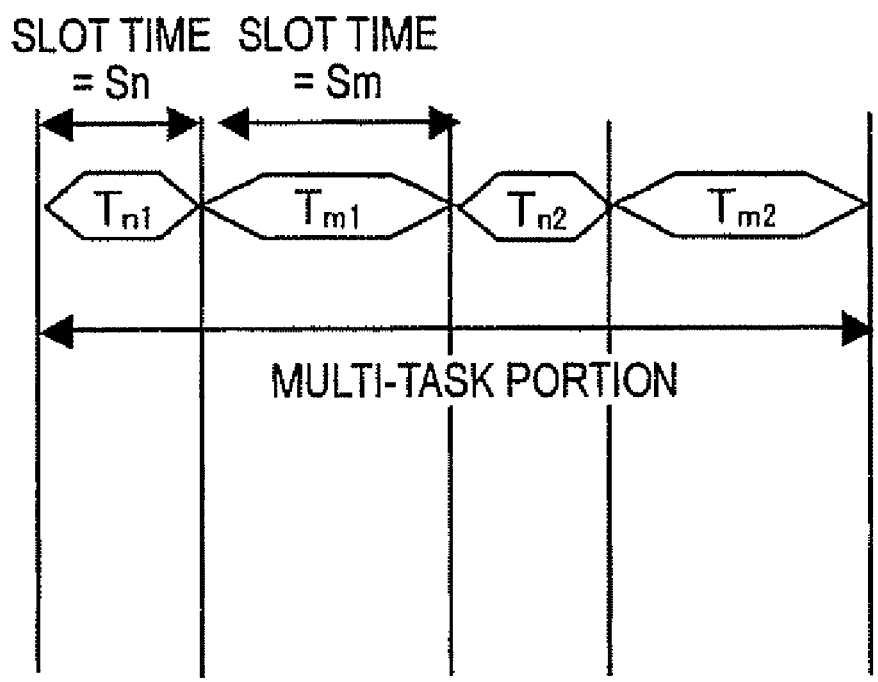
FIG. 18 is a view schematically showing a Slot time for each task.

FIG. 18 is a view schematically showing the Slot time for each task. The Slot time for each task is indicated by $S_n$, the Slot execution unit of $Task_n$ is indicated by nx, the processing time of $Task_n$ is indicated by $T_n$, and it is assumed that $T_n=S_n\times 2$ and $T_m=S_m\times 2$. In the second example, then, the scheduling result is as shown FIG. 18.

In FIG. 18, $Task_n$ is indicated as $T_n$, and $Task_m$ is indicated as $T_m$. In a multi-task portion shown in FIG. 18, in the switching between the first and second circuit configurations which constitute a multi-task processing, a circuit for executing $Task_n$ is set in the first circuit configuration, and that for executing $Task_m$ is set in the second circuit configuration.

In the second example, the Slot times of the tasks are different from each other. When a multi-task processing is configured, therefore, all of $T_n$ and $T_m$ may be processed. Therefore, the second example maximally attains the effect due to a multi-task processing.

[Slot Time for Each Task]

Next, the determination of the slot time for each task will be described. The total of the processing times of $Task_n$ is indicated by $T_n$, the slot time of $Task_n$ is indicated by $Slot_n$, the total of the processing times of $Task_{n+1}$ is indicated by $T_{n+1}$, the slot time of $Task_{n+1}$ is indicated by $Slot_{n+1}$, the number of slots in a multi-task processing is indicated by N, and the threshold of the effect of the multi-task processing is indicated by Eth. Then, the followings are hold:

$$T_n = Slot_n \times N \quad (1)$$

$$T_{n+1} \times Eth = Slot_{n+1} \times N \quad (2)$$

When N of Exp. (1) above is substituted in Exp. (2), the followings are hold:

$$T_{n+1} \times Eth = Slot_{n+1} \times T_n / Slot_n$$

$$Slot_{n+1}/Slot_n = T_{n+1} \times Eth/T_n = T_{n+1}/T_n \times Eth \quad (3)$$

Namely, the slot time for each task is a value which is obtained by multiplying the ratio of the processing times with the threshold Eth of the effect of the multi-task processing. When $T_n=10$, $T_{n+1}=40$, and Eth=0.5 (=50%), for example, the followings are obtained:

$$Slot_{n+1}/Slot_n = 40 \times 0.5/10 = 20/10 = 2$$

When $Slot_n=5$, $Slot_{n+1}=10$ is obtained.

Figure 19:
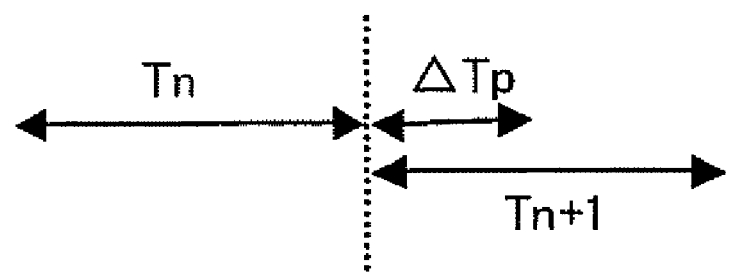
FIG. 19 is a view showing relationships among $T_n$, $\Delta Tp$, and $T_{n+1}$.

With respect to $\Delta Tp$ (the increment of the processing time from a single task) and Eth (the effect of a multi-task processing) which are shown in the first example, it is known that, when $\Delta Tp$ is determined so that $Eth=\Delta Tp/T_{n+1}$, i.e., $\Delta Tp=Eth \times T_{n+1}$ is attained, also the effect of a multi-task processing is controlled (see FIG. 19).

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image processing apparatus comprising:
a dynamic circuit reconfiguring section in which a circuit is dynamically reconfigured;
a circuit configuration storing section that stores information of configurations of circuits, the information including a first piece of information that contains a configuration of a circuit singly performing one image processing, and a second piece of information that contains a configuration of a circuit including a compression circuit that compresses image information for performing a plurality of image processings in parallel; and
a circuit configuration controlling section that switchingly reads out the first piece of information and the second piece of information from the circuit configuration storing section and that controls the circuit reconfiguration in the dynamic circuit reconfiguring section.

2. The image processing apparatus according to claim 1, wherein the circuit configuration controlling section performs a control in which, in a case where a processing time when the circuit performing processings in parallel is configured and the plurality of image processings are performed exceeds a first threshold, circuits that respectively singly perform a plurality of image processings are sequentially reconfigured.

3. The image processing apparatus according to claim 2, further comprising:
a first threshold calculating section that calculates a rate indicative of an effect in a case where the circuit performing processings in parallel is configured and the plurality of image processings are performed, and that performs a calculation of changing the first threshold so that the rate becomes a second threshold,
wherein the circuit configuration controlling section controls the circuit reconfiguration by using the first threshold calculated by the first threshold calculating section.

4. The image processing apparatus according to claim 1, wherein the plurality of image processings include a copy processing and a print processing.

5. An image processing apparatus comprising:
a dynamic circuit reconfiguring section in which a circuit is dynamically reconfigured;
a circuit configuration storing section that stores information of configurations of circuits, the information including a first piece of information that contains a configuration of a first circuit including a compression circuit that compresses image information for performing a plurality of image processings in parallel, and a second piece of information that contains a configuration of a second circuit including the compression circuit; and
a circuit configuration controlling section that switchingly reads out the first piece of information and the second piece of information from the circuit configuration storing section and that controls the circuit reconfiguration in the dynamic circuit reconfiguring section.

6. The image processing apparatus according to claim 5, wherein the plurality of image processings include a copy processing and a print processing.

7. A non-transitory computer readable medium storing a program causing a computer to execute a process for image processing control, the process comprising:
switching configurations of circuits for a dynamic circuit reconfiguring section in which a circuit is dynamically reconfigured,
wherein, the switching step switchingly reads out a configuration of a circuit singly performing one image processing and a configuration of a circuit including a circuit that compresses image information for performing a plurality of image processings in parallel.

8. A non-transitory computer readable medium storing a program causing a computer to execute a process for image processing control, the process comprising:

switching configurations of circuits for a dynamic circuit reconfiguring section in which a circuit is dynamically reconfigured, wherein, the switching step switchingly reads out a configuration of a first circuit including a compression circuit that compresses image information for performing a plurality of image processings in parallel, and a configuration of a second circuit including the compression circuit.

* * * * *